Nov. 12, 1968   R. C. WHITEHEAD, JR., ETAL   3,410,779
MEASURING APPARATUS WITH PRESSURE AMPLIFIER
Filed April 1, 1965

INVENTORS
ROBERT C. WHITEHEAD JR.
LEWIS A. MEDLAR
BY
Arthur H. Swanson
ATTY

3,410,779
MEASURING APPARATUS WITH PRESSURE
AMPLIFIER
Robert C. Whitehead, Jr., Oreland, and Lewis A. Medlar,
Lansdale, Pa., assignors to Honeywell Inc., a corporation of Delaware
Filed Apr. 1, 1965, Ser. No. 444,690
9 Claims. (Cl. 204—195)

It is an object of the invention to disclose a unique pressure-amplifying apparatus which will assist pH and $E_h$ probes in obtaining their respective continuous, accurate, acid-alkaline pH and/or oxidation reduction potential $E_h$ or "redox" measurements when these probes are lowered to any one of a number of depths in a fluid stream of raw water.

Prior to the present invention, attempts have been made to apply a first selected pressure regulator adjusted fluid from an upper surface of the stream to the top of the electrolyte fluid in a reference electrode so that the electrolyte fluid will be forced through an open restricted end of the reference electrode into a stream at a preselected rate when the probes and the reference electrode are lowered to a first preselected depth. When the probes and the reference electrode are lowered into the stream to another depth, attempts have been made to manually adjust the pressure regulator from a location above the stream level to a different value in an attempt to apply a pressure by way of a long tube to the electrolyte fluid and, in this way, hope in an unreliable manner that the right amount of pressure is applied to the electrolyte fluid to force it into the stream at the same preselected rate as that noted above when the probes were at a different level. This is necessary since the electrolyte fluid must flow at a preselected rate in order that a good pH and $E_h$ measurement can be made.

It is for the aforementioned reason that it is another object of the invention to provide a unique stream pressure-actuated, pressure-applying apparatus for a reference electrode unit which will always cause the reference electrode unit to discharge its electrolyte fluid past a reference electrode retained therein at substantially the same rate into a stream of fluid regardless of the depth in the stream at which this electrolyte fluid is desired to be discharged.

It is another object of the invention to disclose a unique, compact, stream pressure-actuated apparatus of the aforementioned type which can be immersed to different levels in a stream with its associated pH and $E_h$ probes and which does not, therefore, require the use of any kind of the aforementioned manually-adjusted regulator and long tube connections.

It is another object of the present invention to disclose a unique pressure-amplifying apparatus of the aforementioned type having a pair of interconnected spring-biased pistons which are of two different diameters and which are positioned in spaced relationship for joint movement in a common cylinder; a first flexible rolling fluid seal in contact with one of the pistons for applying a force thereto that is proportional to the magnitude of the pressure of the fluid in the stream; and a second flexible rolling fluid seal in contact with a second piston for applying a pressure to the electrolyte fluid in a reference electrode unit which is of a greater magnitude than the pressure of the fluid in the stream so that the electrolyte fluid will be forced under all depth operating conditions into the stream at substantially the same rate.

It is, therefore, the principal object of the invention to disclose a piston-actuated rolling fluid seal pressure amplifier unit of the aforementioned type that will cause the electrolyte fluid to be forced out of a reference electrode unit into a stream at an increased pressure as the reference electrode is lowered into deeper levels of the stream so that the rate of discharge of the electrolyte fluid is maintained while an increase in the pressure of the stream at a rate of approximately one-half pound for each foot of travel into these lower depths takes place.

It is another object of the present invention to provide an indicating means for the aforementioned apparatus that will show at any instant of time the amount of unused electrolyte fluid in the reference electrode unit.

A better understanding of the present invention may be had from the following detailed description when read in connection with the accompanying drawings in which.

Figure 3:
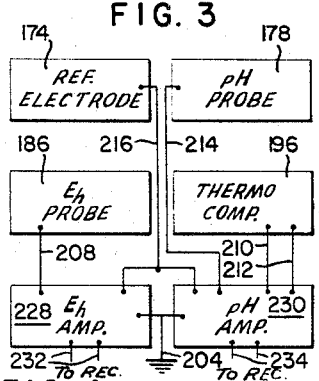
Figure 4:
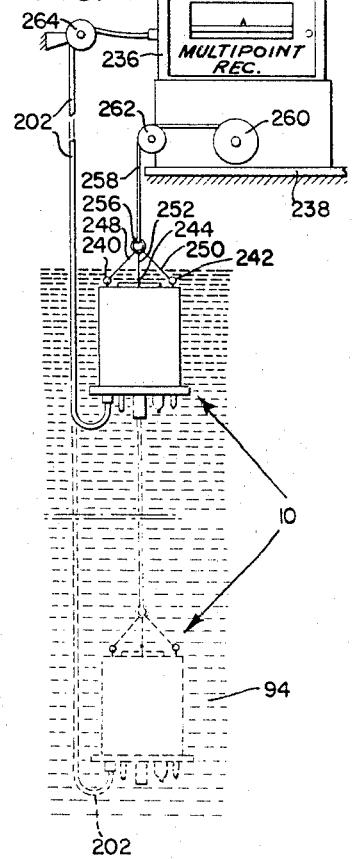

FIGURE 3 shows, in schematic form, how the reference electrode, pH probe and $E_h$ probe are electrically connected to a recorder; and FIGURE 4 is a view showing the mechanism for lowering the pressure-amplifying apparatus, the reference electrode and the pH and $E_h$ probes to various depths in a fluid stream and the use of a multipoint recorder to record the magnitude of the pH and $E_h$ values at these depths.

Figure 1:
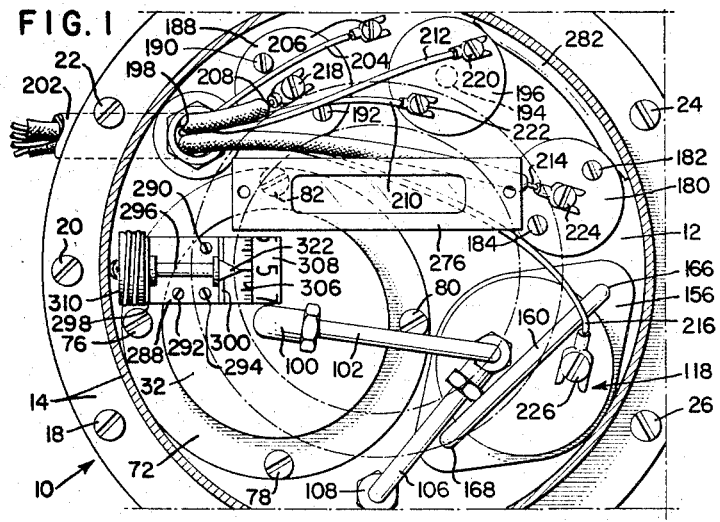
FIGURE 1 is a top plan view showing the aforementioned pressure-amplifying apparatus and the top of the pH and $E_h$ probes with which it is associated.
Figure 2:
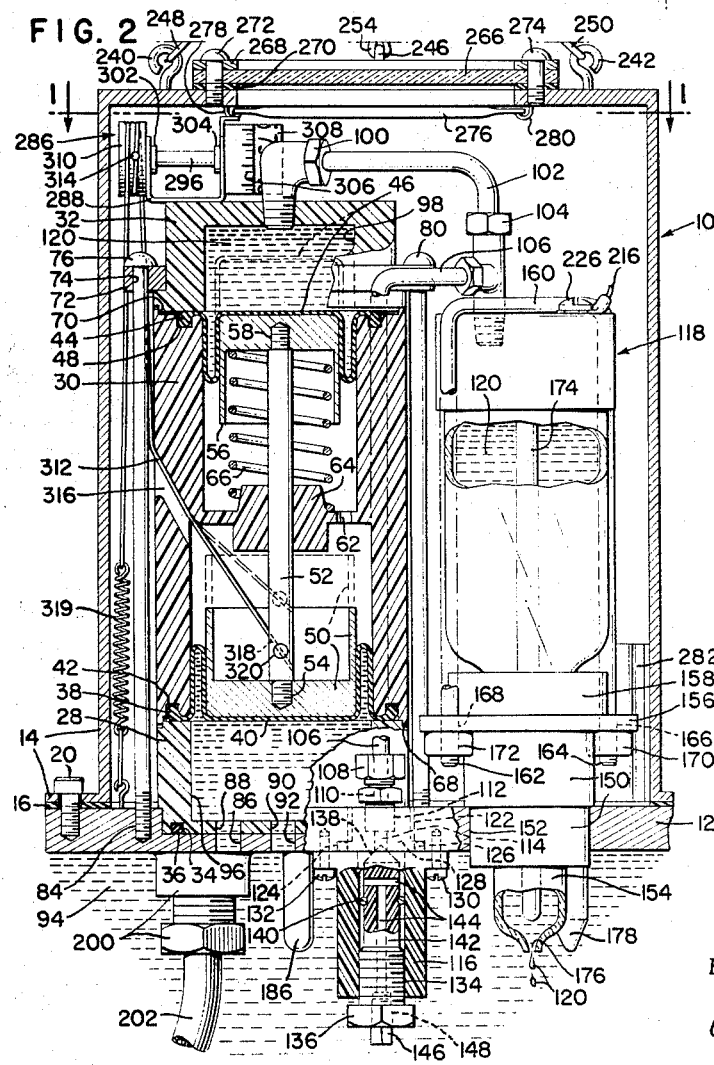
FIGURE 2 is a front elevational view in partial cross-section showing how the aforementioned pressure-amplifying apparatus is pressurized by the fluid stream so that the electrolyte in the reference electrode unit will be forced out into the stream at a prescribed rate in the vicinity of the pH and $E_h$ probes.

FIGURES 1 and 2 disclose a pressure-amplifying apparatus 10 which is useful in amplifying the pressure of a stream so that an accurate pH and $E_h$ value at different stream or ocean depths can be continuously measured and recorded.

This pressure-amplifying apparatus 10 is comprised of a metal base plate 12, a corrosive resistant casing 14 and a gasket 16 between the base plate 12 and casing 14 held together in fluid-tight engagement by the threaded screw connections 18–26.

The portion of the pressure-amplifying apparatus 10 that is mounted inside the casing 14 on the base plate 12 is provided with three hollowed-out cylindrical parts 28, 30, 32. FIGURE 2 shows a groove 34 extending in a ring-shaped fashion on the bottom surface of the cylindrical part 28. A flexible ring 36 of O-shaped cross-section is shown positioned in the groove 34. The bulb-shaped portion 38 extending along the outer circumferential surface of a resilient rolling fluid seal member 40 is shown positioned in a groove 42 that extends in a ring-shaped fashion on the bottom surface of the part 30.

Another bulb-shaped portion 44, extending along the outer circumferential surface of a resilient rolling fluid seal member 46, is also shown positioned in a similar manner in a groove 48 on the top surface of the part 30.

A hollowed-out, cup-shaped piston 50 is shown having its lower and side surfaces in contact with the rolling seal 40. A piston rod 52 is shown having a fixed threaded connection at 54 between its lower end and the piston 50. A second hollowed-out, cup-shaped piston 56 that is of a smaller diameter than the first piston 50 is shown having its top and side surfaces in contact with the rolling seal 46.

A fixed threaded connection at 58 is shown joining the upper end of the piston rod 52 and the second piston 56.

A central part of the cylindrical part 30 is provided with a plurality of apertures, for example 62, and a centrally-located embossed portion 64 for retaining one end of a coil spring 66 in fixed relation therewith. The other end of the spring 66 is shown in FIGURE 2 as being retained in continuous compressed relation with the inner side of the cup-shaped piston 56 to apply a compression force thereto.

For ease of assembly, a dowel-type joint 68 is provided between a top surface portion of the hollow cylindrical part 28 and the lower surface portion of the hollow cylindrical part 30. A similar dowel-type joint 70 is provided between the lower surface portion of the hollow cylindrical part 32 and the top surface portion of the hollow cylindrical part 30.

A ring 72 provided with a plurality of spaced-apart apertured wall portions, such as the apertured wall portion 74, are provided to receive the shank of bolts, for example the tie bolts 76–82, therethrough. A threaded connection is provided between the base plate 12 and the other ends of these tie bolts 76–82, such as is shown at 84 in FIGURE 2. In this manner, the heads of the tie bolts 76–82 are employed to force the ring plate 72 and the lower surface of the cylindrical part 32 against the flexible bulb portion 44, the bottom surface of the cylindrical part 30 against the flexible bulb portion 38 and the bottom surface of the cylindrical part 28 against the O-ring 36 to form fluid-tight joints therebetween.

The base plate 12 and cylindrical part 28 are provided with aligned apertured wall portions 86, 88; 90, 92; therein through which fluid 94 under pressure from the stream at the depth to which the apparatus 10 is immersed can be applied by way of chamber 96 to the lower surface of the rolling seal 40.

The chamber 98 formed by the rolling seal 46 and the inner wall surface of the hollow cylinder 32, the threaded elbow 100, conduit 102, Tee 104, filling tube 106 and the passage in the removable threaded fluid fitting 108, the passageway 110 within the threaded male connection at 112 and passageway 114 in the upper portion of the cylindrical chamber 116 and the reference electrode unit 118 has an electrolyte fluid 120 retained therein.

The cylindrical chamber 116 is shown inserted in a bored-out apertured wall portion 122. The base member 12 also has another bored-out apertured wall portion 124 to accommodate the insertion of an O-shaped ring seal 126 therein. The member 116 also has a flange portion 128 having a suitable number of spaced-apart tap bolts, for example tap bolts 130, 132, passing therethrough, as shown in FIGURE 2, that form a threaded connection between the base plate 12 and the member 116. When these spaced-apart bolts 130, 132 are threadedly connected in the manner shown in FIGURE 2, the upper surface of the flange 128 will compress the O-ring 126 so that it will form a fluid-tight seal between the flange 128 and the base plate 12.

A threaded connection 134 is shown providing a manual adjustment between a valve member 136 and a wall forming an inner bored-out portion of the member 116. The inner plug end 138 of the valve member 136 is of a cone-shaped configuration to seal off the electrolyte fluid 120 in the filling tube 106, as is shown in FIGURE 2. A ring 140 of an O-shaped configuration is employed about an inner cylindrical portion 142 of the valve to prevent any of the electrolyte fluid 120 that may remain in the space between the inner wall of the chamber 116 and the cylindrical portion 142 after the tube is filled from seeping through the threaded connection 134. A T-shaped passageway 144 is also provided within the plug 138 to allow additional electrolyte fluid 120 to flow into the fill tube 106 by way of this passageway 144 and passageways in parts 116, 112, 110, 108 when the valve plug 138 is manually moved away from the seated position and the threaded pipe plug 146, shown in the filling aperture 148 of FIGURE 2, is removed.

The lower end of the reference electrode unit 118 is shown surrounded by a collar 150. This collar 150 is pressed fitted into fluid-tight engagement with an apertured wall portion 152 formed in the base plate 12. A commercially-available, resilient, fluid-tight sealing material (not shown) is retained between the inner wall of the collar 150 and the upper portion of the lower necked end 154 of the reference electrode unit 118. A flange plate 156 surrounds the lower surface of an enlarged circular portion 158 of the collar 150. The central portion of a U-shaped tie bolt 160 is shown in FIGURES 1 and 2 passing over the top of the electrode unit 118 and having threaded end portions 162, 164 passing through associated apertures 166, 168 in the flange 156.

A single threadedly-mounted nut member 170 or 172 is retained on the respective end portion 162 and 164 to maintain the tie bolt 160 and the reference unit 118 retained thereby in a fixed position on the stationary collar 150.

The reference electrode unit 118 is provided with a probe 174 made of a silver-silver-chloride (Ag AgCl) material. This probe 174 is electrically connected to maintain a reference potential between the potassium chloride saturated with silver chloride electrolytic solution 120 and the probe 174 which passes through a restriction 176. The spring 66 enables a force to be applied to the piston 56, rolling seal 46 and the electrolyte fluid 120 to force the fluid 120 through restriction 176 under an atmospheric pressure condition. A pH probe 178 and a fluid-tight flange 180 associated therewith is mounted by a suitable number of screws 182, 184 on the base plate 12 in order to sense the hydrogen ion content of the fluid under measurement surrounding this probe 178.

An $E_h$ probe 186 employs a similar type of fluid-tight flange 188 and two screws 190, 192 to hold the $E_h$ probe in fixed engagement on the base plate 12.

A resistance thermometer 194 is mounted so that it protrudes into the stream below the base plate 12 in a manner similar to the $E_h$ probe 186 shown in FIGURE 2 so that its resistance is altered as changes occur in the temperature of the stream or ocean. A fluid-tight mounting plate 196 similar to those previously described can be employed to retain the resistance thermometer 194 on the base plate 12.

A fluid-tight connection is also shown between an apertured wall portion 198 in the base plate 12 and a dismountable end fitting 200 on a fluid-tight coaxial cable 202. As is best shown in FIGURE 1, this coaxial cable carries a ground lead 204 to a terminal 206 on the metal base plate 12 and the electrical conductor leads 208–216 to the terminals 218–226 associated with their respective $E_h$, resistance thermometer and pH probes 186, 194, 178 and the reference electrode 174. The other ends of the leads 208–216 are connected to the input side of an $E_h$ amplifier 228 and/or a pH amplifier 230, as is best shown in FIGURE 3 of the drawing.

The outputs of the $E_h$ amplifier 228 and the pH amplifier 230 are provided with a suitable pair of electric conductors 232 or 234 to transmit accurate temperature compensated $E_h$ and pH signals to a multipoint recorder 236 where their change in magnitude can be recorded.

The recorder 236 can be mounted on, for example, a stationary dock at 238 (as shown) or reference numeral 238 may be taken as being representative of the top deck of a floating vessel.

The top of the casing 14 of the pressure-amplifying apparatus 10 is provided with four hooks 240–246 embedded therein and protruding therefrom four wire ropes 248–254 are shown securely connected at their lower ends to a different one of the hooks 240–246 and connected at their upper ends to a centering ring 256. The ring 256, in turn, is connected to one end of the hoisting line 258 that is lowered by means of a winch 260 over a pulley 262 along with the pressure-amplifying apparatus 10 from, for example, its solid-line position to its dotted-line position which may be at any one of a number of different depths in the fluid stream or ocean 94.

While the position of the cable 258 is altered in the aforementioned manner, the electrical conductor carrying coaxial cable 202 will be allowed to be rotatably guided over a pulley 264 and another winch (not shown) that is operated in the same manner as the winch 260.

The top of the casing 14 forming a part of the pressure-amplifying apparatus 10, shown in FIGURE 2, is provided with a circular-shaped glass window 266 retained between a ring 268 and a ring gasket 270. This window is held in place, as shown, by means of a series of spaced-apart screw connections 272, 274 that retain the window in compressed fluid-tight engagement with the gasket 270.

A transparent crystal-carrying humidity indicator package 276 is mounted by hooks 278, 280 to the inner wall of the casing 14. The purpose of this indicator 276 is to detect any undesired changes that occur in the humidity within the casing 14 due to water seepage within the casing, etc. This seepage can be immediately visually detected through the window 266 by matching the color of the crystals therein with the safe blue-purple colors and the unsafe tan-pink colors on a non-transparent portion of the package 276.

A porous bag 282 carrying a dehumidifying desiccant is also placed inside the casing 14 in the manner shown in FIGURES 1 and 2 to absorb any condensation that may be present therein.

The casing 14 also contains a rotatable mechanism 286 to indicate the level of the electrolyte fluid 120 that is present at any incident of time within the reference electrolyte unit 118, its associated chamber 98 and the passageway formed in the elbow 100, conduit 102 and T fitting 104 that extend between this unit and the chamber.

The rotatable mechanism 286 is comprised of a U-shaped support member 288 that is fixedly mounted on the top of the cylindrical part 32 by means of the screw connections 290, 292, 294 shown in FIGURE 1.

A shaft 296 is rotatably mounted on the upright parts 298, 300 of the U-shaped member 288 by means of a pair of spaced-apart bearings 302, 304.

A rotatable cylindrically-shaped lined index scale 306, an associated cylindrically-shaped electrolyte fluid level numbered index scale 308, and a grooved drum 310 are fixedly connected by means of a press-fit connection or set screws (not shown) so that they can be rotated in unison with the shaft 296 when it is rotated, as will be hereinafter described.

A non-stretchable cord 312 is shown in FIGURE 1 and FIGURE 2 wrapped about the outer surface of the grooved drum 310 and having a central portion fixedly connected by means of a screw connection 314 to its outer surface. One end portion of the cord 312 is shown passing through an apertured wall portion 316 in the hollow cylindrical part 30 and passing through an aperture 318 formed in the rod 52. The other end of the cord 312 is fixedly attached by way of a coil spring link and hook connection 319 to the base plate 12 to keep the cord in tension under all operating conditions. A set screw threaded connection 320 is employed with the rod 52, as shown, so that the inner end of its shank can be pressed against the end portion of the cord 312 that passes through the aperture in the rod 52.

The upper right part 300 of the U-shaped support member 288 is shown bent to form a stationary pointer 322 about which pointer the lined and numbered indicating scales 306 and 308 are rotated as the electrolyte fluid in the chambers 98 and 120 is slowly forced against the pressure of the stream of fluid 94 into the stream.

Through the use of the aforementioned described indicating mechanism, an observer can determine the quantity of fluid remaining in the chambers 98 and the reference electrode unit 118 by merely looking through the window 266 shown in FIGURE 1 and noting the value on the numbered index scale 308 to which the pointer is directed by means of the lined index scale 306.

It can also be seen from the aforementioned description that the unique pressure-amplifying apparatus 10 will be able to continuously force a small quantity of an electrolyte solution 120 at substantially the same rate into a fluid stream when it is in either the solid or dotted-line position shown in FIGURES 2 and 4 or at any other desired selected depth to which it is desired to be lowered.

As an increase in the pressure of the fluid stream is applied to the rolling fluid seal actuated piston 50 during the descent of the apparatus 10 to lower depths, the pressure that the second piston 50 will apply at that time to the electrolytic fluid 120 will also be increased at a rate that is greater than the pressure of the stream or ocean fluid that is at that time being applied to the first rolling fluid seal actuated piston 50, because of the compression characteristics of the spring 46 and the fact that the piston 56 has a smaller working area than the piston 50.

All of the parts that are in contact with the electrolytic fluid 120 are made of a commercially-available plastic material trade named Polyethelene or Plexiglas, such as the cylindrical chamber 32, fittings 100, 102, 104 and the valve fittings 138, etc., that are associated with the filling tube 106. The rolling seals 40, 98 are made of a rubber material. The reference chamber used as a part of the reference electrode unit 118 is made of a glass material. The outside of the casing 14 of the base plate 12 and the collar 150 that supports the chamber used as a part of the reference electrode unit 23 is made of a stainless steel material.

From the aforementioned description, it can be seen that a unique, self-adjusting, temperature-compensating, pressure-amplifying apparatus has been disclosed for use in making a pH, $E_h$ or other similar measurements of a portion of a continuous flowing or still water portion of a stream or ocean when the apparatus is lowered into the stream or ocean to any one of a number of different depths.

What is claimed is:

1. An apparatus for facilitating the continuous measurement of a quality of a fluid that is present at different depths in a stream of raw water, comprising a first chamber, a first flexible member forming a flexible wall portion of the chamber against which the pressure of the raw water is applied, a second flexible member forming a wall portion of a second chamber, a passageway including a reference electrode unit extending from the second chamber into the raw water, an electrolyte fluid within the second chamber and the passageway, a first piston positioned for movable contact with the inner wall surface of the first flexible wall portion, a second piston, said second piston being operably connected for joint movement with the first piston to provide a means of applying a greater pressure to the electrolyte fluid than the pressure that the stream applies to the first piston by way of the first flexible wall member to thereby force the electrolyte fluid through the reference electrode unit out into the stream.

2. A raw water stream actuated fluid pressure amplifier adapted to continuously discharge an electrolytic fluid from a reference electrode unit into the stream as the amplifier is positioned at different levels below the surface of the stream, comprising a reference electrode unit, a chamber having a first flexible wall portion whose outer wall surface is in physical contact with the stream, a second flexible wall portion positioned within the chamber and having an outer movable surface portion in contact with the electrolyte fluid, means communicating the electrolyte fluid with the reference electrode unit, a rod connecting a piston of a first diameter that is in contact with an inner wall surface of the first flexible wall to a second piston that is of a smaller diameter than the first-mentioned piston and which is in contact with an inner movable surface of the second flexible wall to thereby force the electrolyte fluid through the reference electrode unit into the stream at a higher pressure than the stream itself.

3. A raw water stream actuated fluid pressure amplifier to continuously discharge an electrolyte fluid under pressure at substantially the same rate at different depth levels into the raw river water stream, comprising a reference electrode unit, a casing for immersion to the said different depth levels in the raw water stream, a first rolling fluid seal forming a wall portion of the casing against which the pressure of the raw water stream is applied, a first cup-shaped member operably positioned for movement with a central portion of the seal as pressure changes in the stream are applied thereto, a second rolling fluid seal positioned within the casing and having a face surface thereof in contact with a chamber containing the electrolyte fluid, means communicating the chamber with the stream through said reference electrode unit, a second cup-shaped member connected for movement with the first cup-shaped member, the second cup-shaped member being positioned in physical contact with the other face surface of the second seal and being of a smaller face area than the first cup-shaped member to thereby apply a force to the electrolyte fluid that will cause the pressure of the electrolyte fluid to be of a greater magnitude than the raw water stream into which it is discharged.

4. A raw water stream actuated fluid pressure amplifier to continuously discharge an electrolyte fluid under pressure at substantially the same rate at different depth levels into the raw river water stream, comprising two spaced-apart chambers of different diameters, a rolling diaphragm forming an end wall portion of each chamber, a spool-type member extending between and in phyical contact with opposing flat surfaces of the diaphragms, the flanged end portions of the spool member having different diameters and being spaced at substantially the same distance from the inner surface of the chambers with which they are associated, another flat surface of the diaphragm associated with the larger flange end portion being positioned to have the pressure of the water in the stream applied thereto to move the spool member and the other remaining diaphragm, the chamber containing said last-mentioned diaphragm being provided with an electrolyte fluid therein, and a reference electrode unit having a partially restricted passageway therein connected with said last-mentioned chamber so that the electrolyte fluid is discharged into the stream through said restricted passageway.

5. The fluid pressure amplifier defined in claim 4, wherein a spring-biasing means is positioned between the smaller flange end portion of the spool member and a stationary member to apply a preselected pressure to the electrolyte fluid.

6. The fluid pressure amplifier defined in claim 4, wherein a rotatable electrolyte fluid indicator dial is employed, said dial being operably connected by way of a spring-biased cord and drum to the spool to convert the straight-line movement thereof into rotary movement of the dial.

7. An apparatus for measuring the pH value of a fluid stream at different depths, comprising a passageway having a first rolling diaphragm forming a sealed first end of the passageway, a restricted opening at the other end of the passageway opening into the fluid under measurement, an electrolyte fluid within said passageway, a reference electrode positioned within the passageway adjacent the restricted end to provide a substantially constant potential used in the measurement of the pH value, a pressure-amplifying means in physical contact with the fluid under measurement at one of its ends and being operably connected for joint movement with a second rolling diaphragm that is in contact with the electrolyte fluid at its other end to apply a compressive force to the electrolyte fluid that is of a greater magnitude than the fluid under measurement, and a recorder electrically connected to a pH sensing electrode located adjacent the reference electrode and electrically connected to the reference electrode to indicate the magnitude of the pH value of the fluid.

8. An apparatus for measuring the $E_h$ value of a fluid stream at different depths, comprising a passageway having a first rolling diaphragm forming a sealed first end of the passageway, a restricted opening at the other end of the passageway opening into the fluid under measurement, an electrolyte fluid within said passageway, a reference electrode positioned within the passageway adjacent the restricted end to provide a substantially constant potential used in the measurement of the $E_h$ value, a pressure-amplifying means in physical contact with the fluid under measurement at one of its ends and being operably connected for joint movement with a second rolling diaphragm that is in contact with the electrolyte fluid at its other end to apply a compressive force to the electroltye fluid that is of a greater magnitude than the fluid under measurement, and a recorder electrically connected to an $E_h$ sensing electrode located adjacent the reference electrode and electrically connected to the reference electrode to indicate the magnitude of the $E_h$ value of the fluid.

9. An apparatus for measuring the pH and $E_h$ values of a fluid stream at different depths, comprising a passageway having a first rolling diaphragm forming a sealed first end of the passageway, a restricted opening at the other end of the passageway opening into the fluid under measurement, an electrolyte fluid within said passageway, a reference electrode positioned within the passageway adjacent the restricted end to provide a substantially constant potential used in the measurement of the pH and $E_h$ values, a pressure-amplifying means in physical contact with the fluid under measurement at one of its ends and being operably connected for joint movement with a second rolling diaphragm that is in contact with the electrolyte fluid at its other end to apply a compressive force to the electrolyte fluid that is of a greater magnitude than the fluid under measurement, and a recorder electrically connected to a pH and an $E_h$ sensing electrode located adjacent the reference electrode and electrically connected to the reference electrode to indicate the magnitude of the pH and $E_h$ value of the fluid.

References Cited
UNITED STATES PATENTS

| | | | |
|---|---|---|---|
| 2,725,078 | 11/1955 | Glancy. | |
| 2,820,434 | 1/1958 | Otto. | |
| 2,846,983 | 8/1958 | Otto. | |
| 2,870,077 | 1/1959 | Kushner | 204—195 |
| 2,930,967 | 3/1960 | Laird et al. | 204—195 |
| 3,126,879 | 3/1964 | Canfield. | |
| 3,234,737 | 2/1966 | Hiland | 222—386.5 |

HOWARD S. WILLIAMS, *Primary Examiner.*

T. H. TUNG, *Assistant Examiner.*